United States Patent
Bainbridge et al.

(10) Patent No.: US 9,910,454 B2
(45) Date of Patent: Mar. 6, 2018

(54) SYNCHRONIZER WITH A TIMING CLOSURE ENHANCEMENT

(75) Inventors: William John Bainbridge, Menlo Park, CA (US); Stephen W. Hamilton, Pembroke Pines, FL (US); Neal T. Wingen, Inverness, IL (US)

(73) Assignee: Sonics, Inc., San Jose, CA (US)

( * ) Notice: Subject to any disclaimer, the term of this patent is extended or adjusted under 35 U.S.C. 154(b) by 671 days.

(21) Appl. No.: 13/490,729

(22) Filed: Jun. 7, 2012

(65) Prior Publication Data
US 2013/0329842 A1 Dec. 12, 2013

(51) Int. Cl.
*H04L 7/00* (2006.01)
*G06F 1/12* (2006.01)
*H04J 3/06* (2006.01)

(52) U.S. Cl.
CPC .............. *G06F 1/12* (2013.01); *H04J 3/0697* (2013.01)

(58) Field of Classification Search
None
See application file for complete search history.

(56) References Cited

U.S. PATENT DOCUMENTS

| | | | |
|---|---|---|---|
| 5,948,089 A | 9/1999 | Wingard et al. | |
| 5,964,835 A * | 10/1999 | Fowler | G01R 31/31727 709/216 |
| 6,182,183 B1 | 1/2001 | Wingard et al. | |
| 6,330,225 B1 | 12/2001 | Weber et al. | |
| 6,578,117 B2 | 6/2003 | Weber | |
| 6,725,313 B1 | 4/2004 | Wingard et al. | |
| 7,120,712 B2 | 10/2006 | Wingard et al. | |
| 7,325,221 B1 | 1/2008 | Wingard et al. | |
| 2001/0055331 A1 * | 12/2001 | Agazzi | G01R 31/3004 375/216 |
| 2002/0129173 A1 | 9/2002 | Weber et al. | |
| 2003/0004699 A1 | 1/2003 | Choi et al. | |
| 2003/0074520 A1 | 4/2003 | Weber et al. | |
| 2004/0177186 A1 | 9/2004 | Wingard et al. | |
| 2007/0094429 A1 | 4/2007 | Wingard et al. | |
| 2013/0111148 A1 | 5/2013 | LeCler | |
| 2013/0111149 A1 | 5/2013 | Moll et al. | |

OTHER PUBLICATIONS

U.S. Appl. No. 61/651,202, filed May 24, 2012, Jayasimha, et al.
(Continued)

*Primary Examiner* — Wednel Cadeau
(74) *Attorney, Agent, or Firm* — Rutan & Tucker, LLP

(57) ABSTRACT

Data payload is passed over a boundary from a sender module (SM) on one side of the boundary to a receiver module (RM) on the other side of the boundary. The SM has two or more multiplexers to pass the data payload over to a receiver storage register in the RM. Each multiplexer has 1) its own read address pointer lane coming from sequencing logic located on the RM side and 2) data slots to send data payload from that multiplexer across the boundary to the receiver storage register in the RM in a qualified event synchronization. The sequencing logic ensures that the multiple read address pointers going to the multiplexers have a fixed alternating relationship amongst themselves; and thus, the multiple read address pointers syncopate between each other to move the data payload across the boundary to provide 100% throughput.

20 Claims, 8 Drawing Sheets

(56) References Cited

OTHER PUBLICATIONS

Donohue, Ryan, "Synchronization in Digital Logical Circuits", Lecture Notes from Stanford University downloaded Dec. 16, 2013 from http://www.stanford.edu/class/ee183/handouts/synchronization_pres.pdf. May 5, 2002, 16 pages. Stanford University, Stanford, California, USA.

Ginosar, Ran, "Metastability and Synchronizers—A Tutorial", (c) 2011 IEEE, 14 pages. VLSI Systems Research Center, Electrical Engineering and Computer Science Departments, Technion—Israel Institute of Technology, Haifa 32000, Israel.

Ginosar, Ran, "Fourteen Ways to Fool Your Synchronizer", 8 pages, © 2003; IEEE.org, IEEE Computer Society, Proceedings of the Ninth International Symposium on Asynchronous Circuits and Systems, ASYNC'03 1522-8681/03.

Wingard, Drew, Socket-Based Design Using Decoupled Interconnects, 2002, 30 pages, Interconnect-Centric Design for Advanced SOC and NOC.

Weber, Wolf-Dietrich, "Efficient Shared DRAM Subsystems for SOCs", Sonics, Inc., 2001, 6 pages.

OCP (Open Core Protocol) Specification, Release 2.0, OCP International Partnership 2003 OCP-IP Association, pp. 210 total.

Wingard, Drew, "A Non-Blocking Intelligent Interconnect for AMBA-Connected SoCs", Sonics, Inc., CoWare Arm Developer's Conference, Oct. 6, 2005, 39 pages.

Weber, Wolf-Dietrich, et al., "A quality-of-service mechanism for interconnection networks in system-on-chips", 1530-1591/05, 2005 IEEE, 6 pages.

Wingard, Drew: Tiles: "The Heterogeneous Processing Abstraction for MPSoC", Presentation Notes, 2004, Sonics, Inc., 35 p.

Cottrell, Donald, Chapter 78: "Design Automation Technology Roadmap", The VLSI Handbook, Copyright 2000, CRC Press, LLC, Boca Raton, FL US, 41 Pages.

"Electronic Design Automation", 11 pages, Wikipedia, Downloaded May 21, 2009 from http://en.wikipedia.org/wiki/Electronic_design_automation.

Faber, Robert C., "Landis on Mechanics of Patent Claim Drafting", § 46, Cover Page and pp. V-4 to V7. Release No. 4, Dec. 2000. 5 pages, Practicing Law Institute, New York City.

Gupta, Sumit and Gupta, Rajesh K., Chapter 64: "ASIC Design", The VLSI Handbook, Copyright 2000, CRC Press, LLC, Boca Raton, FL US, 29 pages.

Hurst, Stanley L., Chapter 5: "Computer Aided Design", VLSI Custom Microelectronics: Digital, Analog, and Mixed-Signal, Copyright 1999, Marcel Dekker, Inc. 95 pages.

\* cited by examiner

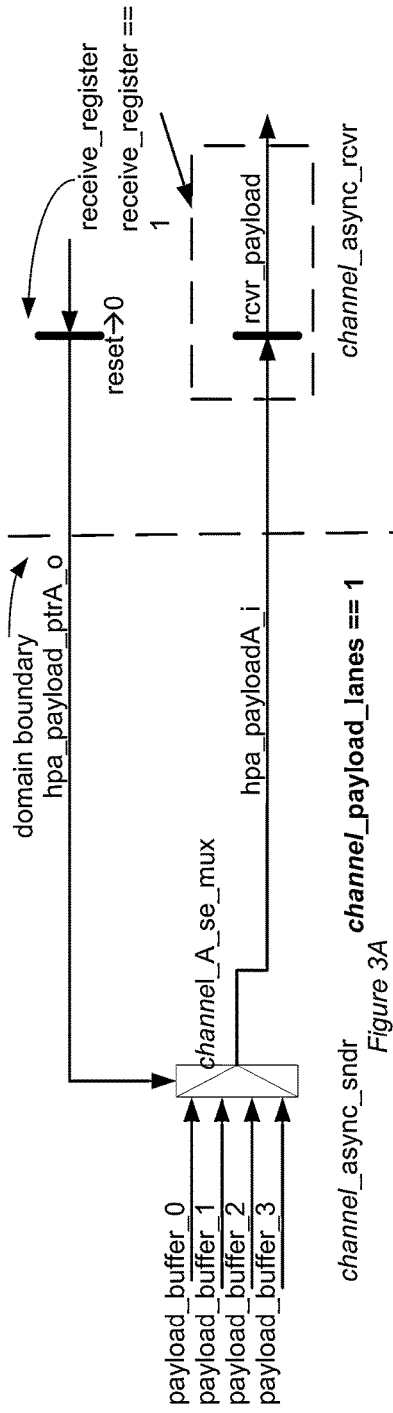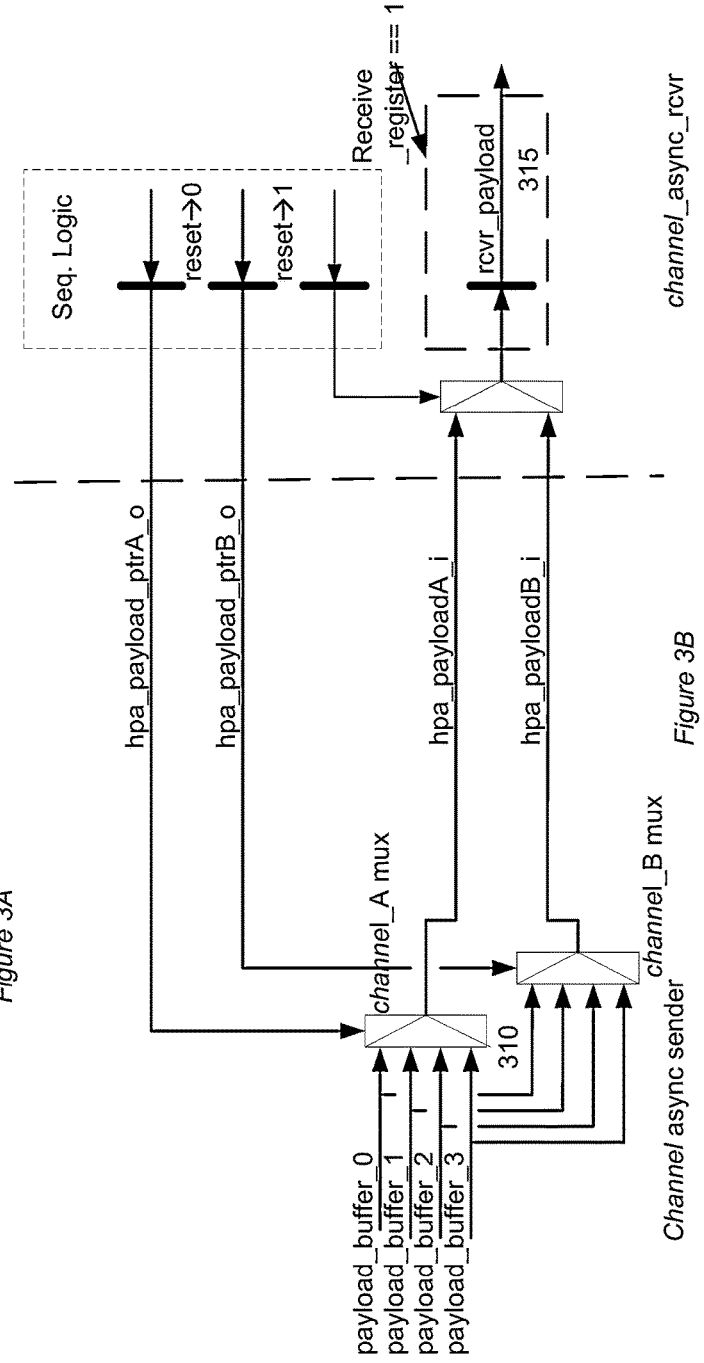

SYNCHRONIZER WITH A TIMING CLOSURE ENHANCEMENT

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

FIELD OF THE INVENTION

Embodiments of the invention generally relate to one or more payload crossing synchronizers implemented in an integrated circuit.

BACKGROUND OF THE INVENTION

A System-on-a-Chip design may have a multitude of power domains, clock domains, voltage domains, and partitioning boundaries.

SUMMARY OF THE INVENTION

Various methods and apparatus are described for one or more payload crossing synchronizers implemented in an integrated circuit. A payload crossing synchronizer includes a sender module on one side of a boundary and a receiver module on the other side of the boundary. The payload crossing synchronizer has an internal communications path between the sender module and the receiver module. The communications path is implemented with spatial concurrency having M amount of identical paths in parallel called lanes. Each of the M lanes, when a total of N amount of lanes are active, operates at a divide-by-N of the receiver frequency. The sender module and the receiver implement compatible interleave and de-interleave algorithms with an inverse relationship respectively. A storage buffer supplies data payload to be moved across the boundary from the sender module to a receiver storage register in the receiver module, and the storage buffer and the receiver storage register operate according to separate clocks.

BRIEF DESCRIPTION OF THE DRAWINGS

The multiple drawings refer to the embodiments of the invention.

FIGS. 3A and 3B illustrate diagrams of embodiments of a payload crossing synchronizer instance used in a single lane boundary crossing in the upper circuit (FIG. 3A) and another payload crossing synchronizer instance used in a multiple lane boundary crossing in the lower circuit (FIG. 3B).

Figure 1:
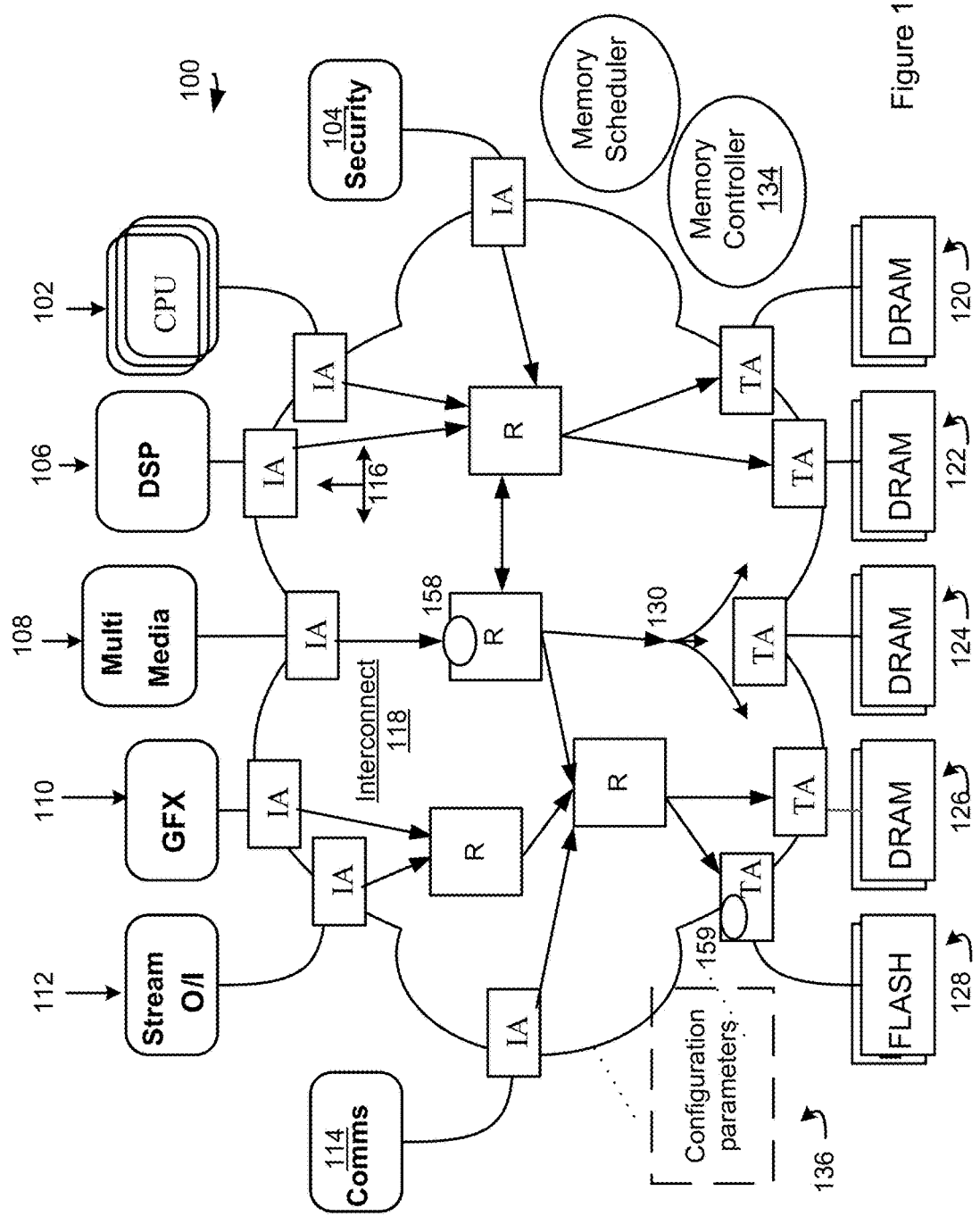
FIG. 1 illustrates a block diagram of an embodiment of an integrated circuit, such as System-on-a-Chip.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific routines, named components, connections, number of power domains within an integrated circuit, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, multiple features of or useable with a payload crossing synchronizer are described. The payload crossing synchronizer includes a sender module on one side of a boundary and a receiver module on the other side of the boundary. The sender module has a storage buffer, which is clocked at a write clock frequency. The sender module also has two or more multiplexers to pass the data payload over to a receiver storage register in the receiver module, which is clocked at a read clock frequency. Each of the two or more multiplexers on the sender side of the boundary has 1) its own read address pointer lane coming from sequencing logic located on the receiver side and 2) its own data payload lane to send data payload from that multiplexer across the boundary to the receiver storage register on the receiver side in a qualified event synchronization. The source of the write clock frequency clocking the storage buffer feeding data payload to the multiplexers is separate from a source of the read clock frequency clocking the receiver storage register, so that the two clocks may have either an asynchronous relationship, a mesochronous relationship, or even a synchronous relationship. The sequencing logic ensures that the multiple read address pointers going to the two or more multiplexers have a fixed alternating relationship amongst themselves to be able move the data payload across the boundary to provide one hundred percent throughput from the sender module to the receiver module, as measured on the receiver side based on a capacity of the sender side to supply that amount of data payload.

In general, in an interconnection network, there are a number of heterogeneous initiator agents (initiator agents) and target agents (target agents) and routers. As the packets travel from the initiator agents to the target agents in the interconnect network, they travel through a multitude of power domains, clock domains, voltage domains, and partitioning boundaries.

FIG. 1 illustrates a block diagram of an embodiment of an integrated circuit, such as System-on-a-Chip. The integrated circuit 100 includes multiple initiator Intellectual Property (IP) cores and multiple target IP cores that communicate read and write requests as well as responses to those requests over a network on the chip/interconnect network 118. The interconnect network 118 may also be referred to as a packet-based switch network because the data transferred within the interconnect network 118 is in the forms of packets. Some examples of initiator IP cores may include a CPU IP core 102, an on-chip security IP core 104, a digital signal processor (DSP) IP core 106, a multimedia IP core 108, a graphics IP core 110, a streaming input-output (I/O) IP core 112, a communications IP core 114 (e.g., a wireless transmit and receive IP core with devices or components external to the chip, etc.), etc.

Each initiator IP core may have its own initiator agent (IA) (e.g., 116, etc.) to interface with the interconnect network 118. Some examples of target IP cores may include DRAM IP core 120 through DRAM IP core 126 and FLASH memory IP core 128. Each target IP core may have its own target agent (TA) (e.g., 130) to interface with the interconnect network 118. Each of the DRAM IP cores 120-126 may have an associated memory controller 134. Similarly, the flash memory 128 is associated with a flash controller. All of the initiator IP cores 102-114 and target IP cores 120-128 may operate at different performance rates (i.e. peak bandwidth, which can be calculated as the clock frequency times the number of data bit lines (also known as data width), and sustained bandwidth, which represents a required or intended performance level). Further, routers in the interconnect fabric 118 may operate at different performance levels. Portions of the interconnect network 118, memory controller 134, and potentially the memory scheduler may be laid out in different layout partitioning blocks. Portions of the interconnect network, memory controller 134, and potentially the memory scheduler may be in different power domains. The interconnect network 118 illustrates some example routers where the information flows from the initiator IP cores and initiator agents to the target agents and target IP cores. Although not illustrated, there is a corresponding response network that connects the target IP cores and the target agents to the initiator agents and initiator IP cores. The routers may be used to route packets within the interconnect network 118 from a source location (e.g., the initiator IP cores 102-114) to a destination location (e.g., the target IP cores 120-128) in the integrated circuit. The number of routers may be implementation specific (e.g., topology used, area requirement, latency requirement, etc.). The data sent from the initiator IP core 102 to the target IP core 122 may be packetized by packetizing logic associated with the IA 116 before being sent into the interconnect network 118. The packets may pass through the routers. The packets may then be depacketized by depacketizing logic associated with the target agent 130 when they leave the interconnect network 118.

The network on a chip/interconnect network 118 implements many concepts including one or more of: a credit flow control scheme in a router with flexible link widths utilizing minimal storage; use of common data formats to facilitate link width conversion in a router with flexible link widths; low cost methods to achieve adaptive transaction and packet interleaving in interconnection networks; efficient schemes to quiescence and wakeup power management domains in a highly partitioned NoC Based SoC; mesochronous and asynchronous synchronizers with credit based flow control; an area efficient mesochronous synchronizer design; as well as many additional concepts.

A first instance of the payload crossing synchronizer 158 can located at a first boundary in the interconnect network 118 in the integrated circuit. A second instance of the payload crossing synchronizer 159 can be located at a second boundary in the interconnect network 118, and so on. The type of payload crossing synchronizer placed at the first and second boundaries is individually selectable at design time via configuration parameters, and configuration parameters exist for at least two or more types of payload crossing synchronizer.

Figure 2:
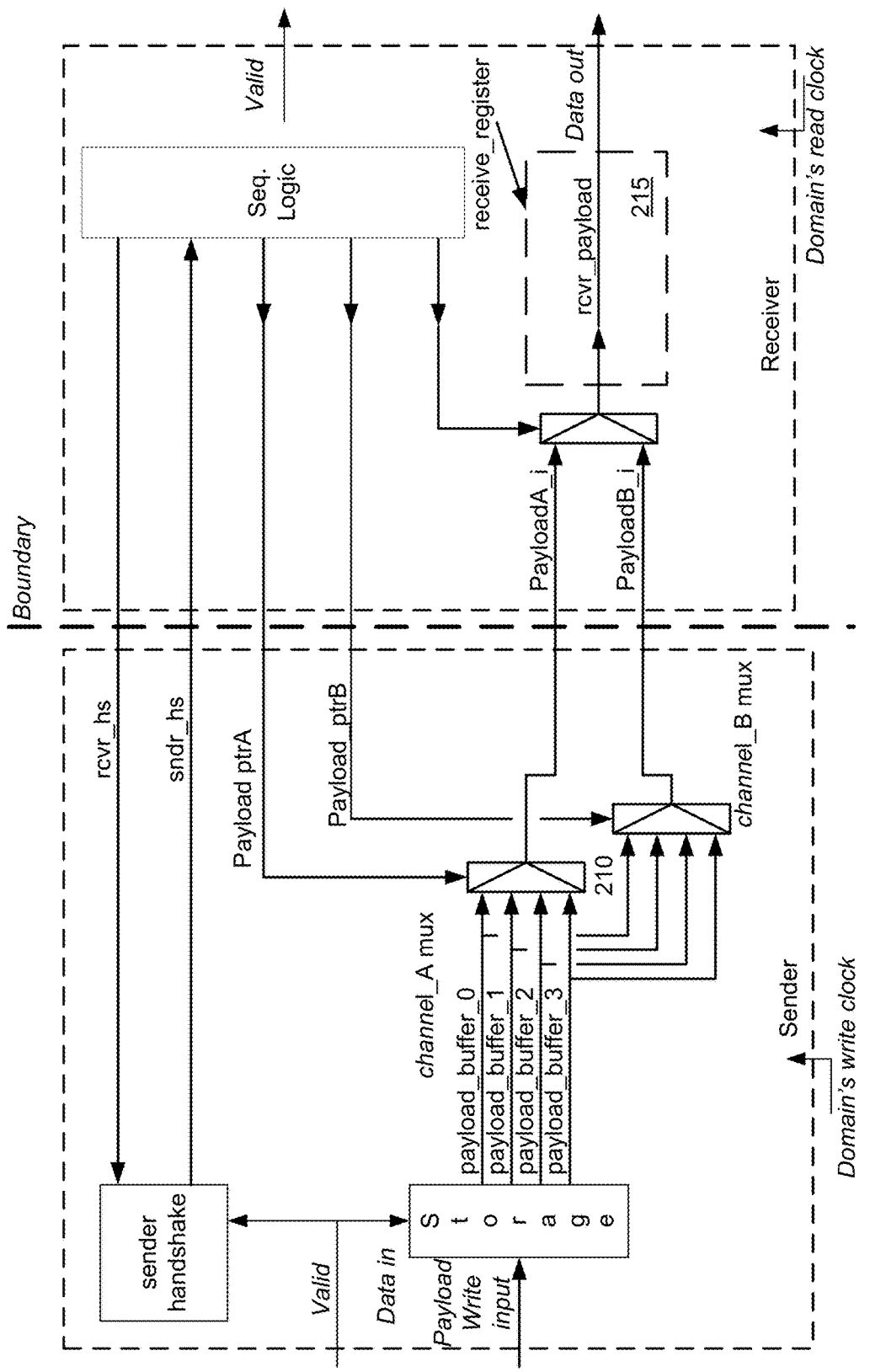
FIG. 2 illustrates a diagram of an embodiment of a payload crossing synchronizer that has an internal communications path that crosses a boundary between the sender module and the receiver module.

FIG. 2 illustrates a diagram of an embodiment of a payload crossing synchronizer that has an internal communications path that crosses a boundary between the sender module and the receiver module. The architectural changes in the interconnect network support multiple read access lanes and multiple operating modes, and can be fairly well localized at different power domains, supply voltage domains, and/or layout partitioning boundaries that have components on the two sides operating according to different clocks. The payload crossing synchronizer may include a sender module on one side of a boundary and a receiver module on the other side of the boundary. The payload crossing synchronizer has an internal communications path between the sender module and the receiver module. The communications path is implemented with spatial concurrency having M amount of identical paths in parallel called lanes, where each of the M lanes when a total of N lanes are active divide-by-N of the receiver frequency. Relationship wise, M amount of paths instantiated is greater than or equal to the N amount of lanes active. The sender module and the receiver module implement compatible interleave and de-interleave algorithms with an inverse relationship respectively. The sender module has two or more multiplexers 210 to pass data payload over to receiver storage register 215 in the receiver module, which is clocked at a read clock frequency. A storage buffer, which is clocked at a write clock frequency, supplies the data payload to be moved across the boundary from the sender module to a receiver storage register 215 in the receiver module. The storage buffer and the receiver storage register 215 operate according to separate clocks.

Sequencing logic implements the interleave and de-interleave algorithms to regulate the communications path to achieve a 100% utilization rate at frequency F even though each part of the communications path operates at merely F divided by the N amount of active lanes. The sequencing logic implementing the algorithms causes a series of transfers that are numbered sequentially, and modulo X assigned to one of X storage buffer locations in the sender module. Each of the lanes includes 1) its own read address pointer by which the sequencing logic specifies the buffer storage location to be accessed (payload pointerA and payload pointerB in FIG. 2) and 2) its own output data path to the receiver storage register 215 in the receiver module. The sequencing logic starts an access each cycle, selecting one lane using a rotating pattern, and offering the storage location address (also produced as a sequential numbering modulo X) on the read pointer for that lane. In this fashion, N amount of accesses are in progress at once, on N amount of different active lanes, and at N amount of different stages of completion.

The sequencing logic ensures that the multiple read address pointers going to the two or more multiplexers 210 have a fixed alternating relationship amongst themselves to be able move the data payload across the boundary to provide one hundred percent throughput from the sender module to the receiver module as measured using a slower of the sender module's and receiver module's clock.

FIGS. 3A and 3B illustrate diagrams of embodiments of a payload crossing synchronizer instance used in a single lane boundary crossing in the upper circuit (FIG. 3A) and another payload crossing synchronizer instance used in a multiple lane boundary crossing in the lower circuit (FIG. 3B). A design-time configurable parameter for the interconnect network can be used to make selectable choices to place the different types of payload crossing synchronizers at boundaries. The different types of payload crossing synchronizers include payload crossing synchronizers with multiple read access lanes as well as ones with single read access lanes. This feature adds a structural configuration option to support either a payload crossing synchronizer instance with a single lane crossing or a payload crossing synchronizer instance with multiple lane crossing to allow the cost/capability tradeoff to be tailored for the system requirements such as specified (high utilization) protocols, such as AXI and its channels and OCP and its phases.

By default, a single lane crossing is configured to work in a single receiver clock period. A run-time (reset time) option configurable register is made available to cause this path to operate as a two-cycle path. However, this single lane/single receiver clock period can reduce the peak utilization (BW) on the channel/phase destination's interface to 50% when the receiver side is at a higher clock.

The design-time parameter allows configuration of the channels with multiple access paths such as two read pointers and two payload vectors. The multiple access paths between the sender module and receiver module cross the boundary. These multiple access paths can each be accessed with the longer 2-cycle (50% utilization) sequence, but with the sequences overlapping (in syncopation), so the received utilization (BW) can still achieve 100%. This is called a multiple lane crossing (using two lanes in this example).

The payload crossing synchronizer used in a multiple lane boundary crossing includes two or more multiplexers 310 on the sender side of the boundary. Each of the two or more multiplexers 310 on the sender side of the boundary has 1) its own read address pointer lane coming from sequencing logic located on the receiver side and 2) its own data payload lane to send data payload from that multiplexer across the boundary to the receiver storage register 315 on the receiver side in a qualified event synchronization. The payload crossing synchronizer has the multiplexers 310 to act as two or more read ports for data payload in the buffer to be supplied to the receiver storage register 315 in this two or more lane arrangement across the clock domain boundary. The two or more read ports syncopate to provide full throughput capability whilst effectively each operating at half rate. Thus, allowing two or more cycles for the read address pointer information and the data payload, to cross the boundary instead of these signals needing to pass across the boundary in a single cycle for a tight timing loop. The multiplexers 310, sequencing logic, and receiver storage register 315 combine to create a timing-closure friendly multiple lane synchronizer for one or more boundary crossings in the interconnect network.

On the sender side, the payload crossing synchronizer includes a Write input to a storage buffer, and a path from each entry in the storage buffer to the one or more multiplexers 310, a Write clock input for the write clock frequency to the storage buffer, a read address pointer input per multiplexer 310, and a single-output data-payload multi-bit vector per multiplexer 310. In order to minimize the number of signal wires that cross the boundary for each channel/phase, the read access port to the FIFO storage buffer is in the channel/phase sender's of the boundary. This means the access path crosses the boundary twice: the read address pointer (i.e. payload address that is to be read out of the FIFO buffer) carried by a lane/channel crosses from the channel/phase receiver side to the channel/phase sender side of the boundary, and then the selected data payload word from its slot in the storage buffer is read out and sent across the boundary to the receiver storage register 315.

The sequencing logic ensures that the multiple read address pointers going to the two or more multiplexers 310 have a fixed alternating relationship amongst themselves to be able move the data payload across the boundary to provide one hundred percent throughput from the sender module to the receiver module, as measured using the receiver module's clock, provided sender data is continuously available.

The payload crossing synchronizer addresses the timing-closure challenge of implementing a clock-domain crossing with a decreased amount of wires needed across a power domain, voltage supply domain, or layout boundary where components on each side of the boundary operate with separate clocks whilst achieving one hundred percent utilization of the receiver clock domain for maximum performance. At the boundary, two or more lanes that are syncopated over two or more cycles make timing closure more easily achieved for the read ports of the data payload crossing synchronizer.

The payload crossing synchronizer also provides for a simple protocol and validity check by which the sender side and receiver side interface with their respective ends of the payload crossing synchronizer. Specifically, when the sender side and its end of the payload crossing synchronizer are ready, a data transfer matched to its flow control information takes place from the sender side to the receiver side of the payload crossing synchronizer.

The sender module and the receiver module engage in a qualified event synchronization to communicate status change events regarding use of entries in the storage buffer. A qualifier event synchronization across the boundary may be as follows. Vectors (multi-bit words) cannot be directly synchronized across clock domains reliably and without corruption. The data payload synchronizer may use a validity event qualifier technique for such crossings. The sender offers the vector, and at the same time a qualifying event, which indicates the word is valid. The sender agrees to hold the vector steady after that point. The receiver synchronizes the event. Once the receiver sees the synchronized event the receiver knows the vector is reliably available for capture. In one embodiment, the receiver uses delta encoded validity bits as the mechanism for qualifier event synchronization. In the delta encoded validity bits as the mechanism for qualifier event synchronization, in order to qualify data payloads to be transferred, a single modulo 2 counter bit per sender storage entry is maintained by the sender module and the receiver module each, and each sending a copy of these bits to the other for synchronization. The sender increments the count for an entry when that entry is made available to the receiver. The receiver increments the count for an entry when that entry is accessed from the sender. Thus either entity can compare the two count values for each entry and determine its status. The read address pointers themselves and the incrementing logic in the sequential logic are used to ensure each pointer reads the data payload at the head of the line for that multiplexer as well as that the read pointer does not pass the write pointer. The read pointers are also passed to the sender and used as address pointers by dual lanes to move the data across the boundary from the sender to the receiver, and where the selected pointer is used to access the selected modulo 2 counter bit comparison within the receiver to assure capture into the receive register only occurs for valid entries. In another embodiment, the two sides of the payload crossing synchronizer may also coordinate qualifier event synchronization by using a common recirculating FIFO and choosing the data payload address of interest with sequential pointers. The pointers are replicated for the tasks of event qualification as well as use in actually moving the data.

Read accesses of the FIFO storage buffer across the boundary require two receiver clock periods at a minimum. The payload crossing synchronizer has two or more lanes carrying read address information on which RAM addresses or Register slots of the buffer are to be read out and cross the boundary. The lanes operate in syncopation to reduce the effective transfer rate around a tight timing loop that twice crosses the clock-domain boundary.

This design covers a timing closure enhancement to the clock support interface of the interconnect. The payload crossing synchronizer can be used at a clock domain crossing (CDC), or simply clock crossing where components on the two sides of the boundary operate according to separate clocks. The crossing typically coincidentally occurs at any of a power domain boundary, a supply voltage boundary, and/or a layout partitioning boundary when the data payload crosses from one clock domain into another.

The payload crossing synchronizer may be used with example protocols, such as a channel in AXI's protocol or a phase in OCP's protocol, while the multiple cycle access and transfer is being performed across the boundary. The payload crossing synchronizer has one or more internal storage buffers, such as a First in First out (FIFO) register or other storage mechanisms like a Random Access Memory, for local storage while the data payload access and transfer is being performed across the boundary that has components on the two sides of the boundary operating according to the separate clocks.

Note, the sender module and receiver module may be synchronous modules operating on different clocks so that a communications path crossing the boundary is operated as a mesochronous crossing with clocks of the same frequency but out of phase or even as an asynchronous crossing with clocks of different frequencies. Generally, the payload access is synchronous within the receiver module, even though a portion of its path is in the sender module and the receiver module.

Figure 4:
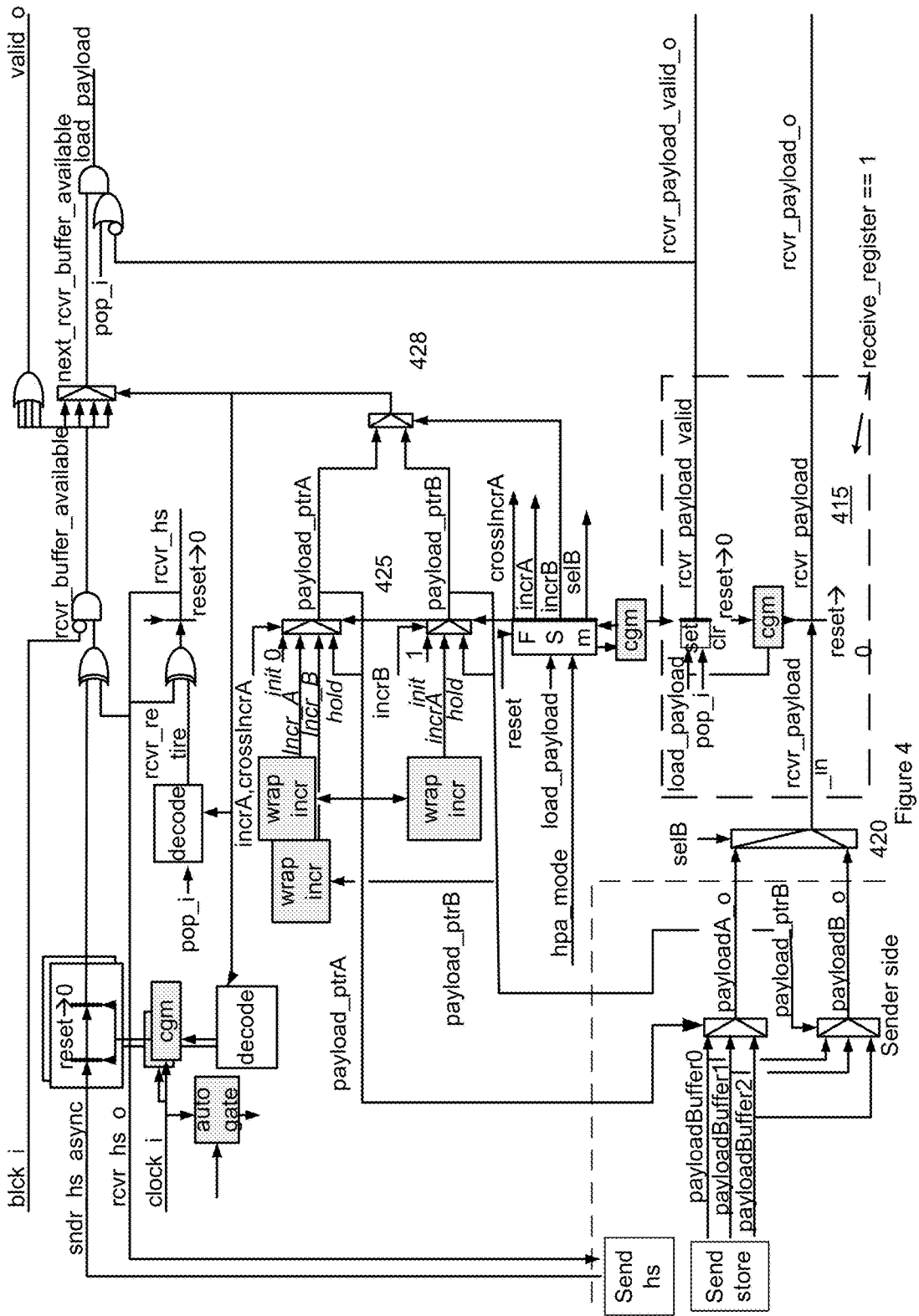
FIG. 4 illustrates a diagram of an embodiment of a receiver module with components to support multiple lanes crossing the boundary.

FIG. 4 illustrates a diagram of an embodiment of a receiver module with components to support multiple lanes crossing the boundary.

On the sender side, the payload crossing synchronizer has multiple copies of the multiplexers feeding the receiver storage register 415. Note, the amount of input wires used for the duplicated multiplexers may be optimized. The multiplexers act as read-ports to a buffer or memory accessed in FIFO fashion in order to present a multiple lane arrangement across the boundary. Note, in embodiment some sort of relationship exists between the data input order and data read output order but not necessarily a FiFo order. The read ports syncopate to provide a full-throughput capability whilst effectively each operating at half-rate, thus allowing two-cycles to complete the access instead of one for the tight timing loop. The payload crossing synchronizer also has another multiplexer 420 on receiver side to select which data payload coming from the multiplexers is to be selected to pass for this cycle.

On the receiver side, the receiver module has fundamentally 1) sequencing logic 425 for re-circulating read address pointers in the FIFO storage buffer in the sender module, 2) flow control logic, and 3) a receiver storage register 415. The payload crossing synchronizer has another multiplexer 428 on the receiver side to indicate which address is feeding the data payload, so the receiver side may check the flow control signals.

The sequencing logic 425 controls a value of a first read address pointer carried by a first lane across the boundary to a first multiplexer in the sender module that directs the first multiplexer on which data payload word should be selected from its data slot in the storage buffer to be read out and sent across the boundary to the receiver storage register in the receiver module. The sequencing logic 425 controls a value of a second read address pointer carried by a second lane across the boundary to a second multiplexer in the sender module and directs the second multiplexer on which data payload word should be selected from its data slot in the storage buffer to be read out and sent across the boundary to the receiver storage register 415 in the receiver module. The sequencing logic 425 controls an activation of a third multiplexer 420 to choose whether payload data going to the receiver storage register 415 on that cycle is coming from the first multiplexer or the second multiplexer. The third multiplexer 420 is in the path between the first and second multiplexer and the receiver storage register 415.

The sequencing logic 425 has a state machine and wrapping incrementing logic to control values for the multiple read address pointers going to the two or more multiplexers. The read pointer value is formally represented by the payload pointer registerA and payload pointer registerB, but it is redundantly represented by the receiver_hs register. The payload pointer is binary encoded, while receiver_hs delta 1-hot encoded—that is the pointer value is encoded by the bit at which a transition from the previous bit exists. Two such transitions exist (0→1 and 1→0). One is selected by a modulo count that records how many times the pointer has wrapped.

The sequencing logic 425 has a detection portion to detect when one or more data payloads are present to be transferred from the multiplexers to the receiver storage register 415. The payload crossing synchronizer has a comparator to determine when new data is present. FIFO empty status is determined by comparing receiver_hs to the incoming sender_hs.

The sequencing logic 425 has a validation portion to validate flow control information associated with the data payload passed from the sender module to the receiver module. The sequencing logic 425 may be configured to indicate which address out of the two or more multiplexers is supplying the data payload so the logic in the receiver side may check any flow control signals and validate the data payload. When the first in first out buffer is not empty, the incoming value on payload_i is valid. Valid input is captured into the receiver storage register 415 (when it is configured) or passed to the output (when it is not). At the same time the payload pointer is advanced (a wrapping increment), and the associated bit of receiver_hs is toggled. The accessed FIFO word is loaded (either into the downstream stage or into the receive register 415) by the load_payload control. This control is asserted when the first in first out buffer is not empty, and when either the receive register 415 is empty or it is being emptied (pop_i). The sequencing logic 425 migrates the data payload over to the receiver clock domain in valid state.

In an embodiment, flow control logic is configured to share validity bit information, and perform a validity check of the data payload. The sequencing logic 425 transfers the data payload to traverse into the receiver storage register 415 in the receiver module with a form of feedback from the receiver module to the sender module indicating that the flow control signaling and data payload have been detected and are valid for crossing the boundary. The flow control logic and the sequencing logic 425 cooperate to support moving data payload from outputs of the two or more multiplexers to the receiver storage register 415.

In an embodiment, the wrapping incrementing logic operates as follows.

The payload pointer register has three operations. The payload pointer register is initialized to 0 by functional reset. When load_payload is asserted a wrapping increment is performed—if the current value is at its maximum (a value determined by the 'payload_buffers' parameter), it is wrapped by loading 0; and if the current value is not at its maximum, it is incremented. If neither functional reset nor load_payload is asserted the current value is re-circulated. The register requires the func_reset and load_payload controls, and the at_wrap_point status signal.

Note, the payload_pointerA register may have four operations. The first two are initialization to 0; and wrapping increment of payload_pointerA. payload_pointerA register is initialized to 0. If incrA is asserted, then the wrapping increment is performed—at_wrap_point status determines if 0 is loaded, or if the value is incremented. The payload pointer and payload ports indicate lane A. The payload_pointerA register has third and fourth operations. The third operation, a wrapping increment of payload_pointerB, is controlled by crossIncrA. If both incrA and crossIncrA are un-asserted, the payload_pointerA register value is re-circulated.

Likewise, payload_pointerB register is implemented with 3 operations. The payload_pointerB register is initialized to 1. When incrB is asserted, a wrapping increment of payload_pointerA is loaded. If incrB is un-asserted, the payload_pointerB register value is re-circulated.

In the "multiple lane full rate", operating mode payload_pointerA and payload_pointerB are alternated by the state machine (FSM). When incrB is un-asserted, payload_pointerA is passed through the multiplexor and is used to select which entry will be retired. At the same time, selB is un-asserted so that payloadA is selected for capture in receiver_payload. When the load_payload signal is asserted, the payload is captured, the selected bit of receiver_hs is toggled, payload_pointerB is maintained, and payload_pointerA performs a wrapping increment of payload_pointerB.

When incrB is asserted, payload_pointerB is passed through the multiplexor and is used to select which entry will be retired. At the same time, selB is asserted so payloadB is selected for capture in receiver_payload. When the load_payload signal is asserted, the payload is captured, the selected bit of receiver_hs is toggled, payload_pointerA is maintained, and payload_pointerB performs a wrapping increment of payload_pointerA.

The payload pointer is also used to address sets of bits in the sender_hs, for which the synchronizers will be enabled. This minimizes the number of flops with free-running clocks.

As discussed, multiple access lanes between the sender module and receiver module cross the boundary, including the lanes carrying the read address pointers and the lanes carrying the data payload out of each of the multiplexers. The sequencing logic 425 is configured to process a detection of data payload to be transferred from a multiplexer and a sending of a read address pointer to an appropriate multiplexer in equal to or longer than a two clock cycle duration on the receiver side. Thus, the two or more multiplexers can individually be accessed with at least a two-cycle sequence, but with the sequences overlapping in a fixed alternating relationship between the two or more multiplexers so a utilization rate of the receiver storage register 415 achieves 100%.

Accordingly, the payload crossing synchronizer moves data payload indicated by the read address pointer across boundary over a duration of two or more cycles to synchronize and validate the data payload. The payload crossing synchronizer generally loses merely one cycle per series of related data payload addresses being moved over the boundary.

Overall, the design produces less congestion on an amount of logic used and a number of wires used to cross the boundary.

Figure 5A:
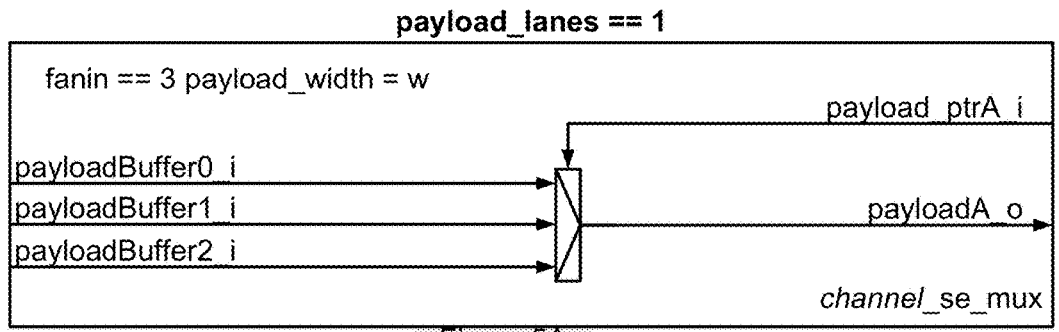
FIGS. 5A, 5B, and 5C illustrate diagrams of embodiments of multiplexers used in single lane and multiple lane payload crossing synchronizers.
Figure 5B:
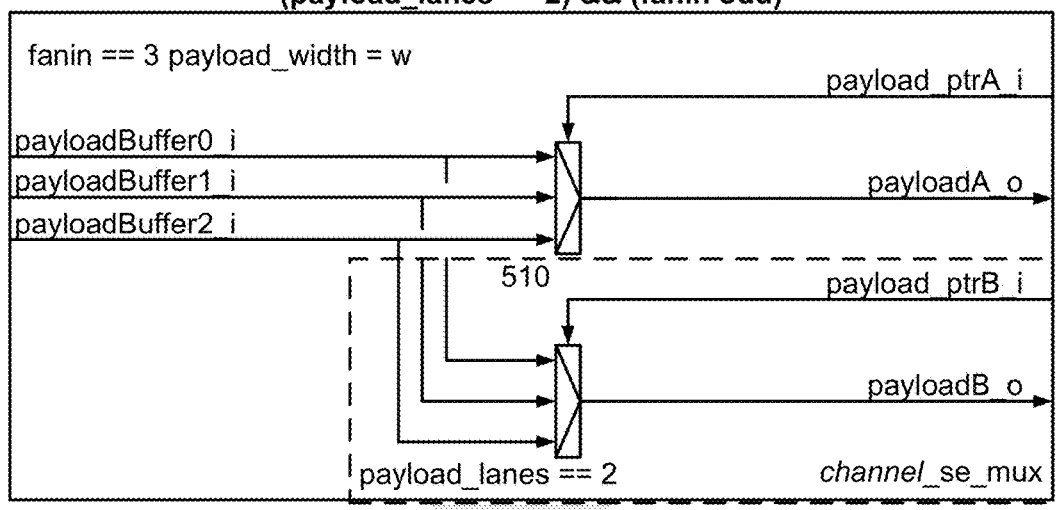
Figure 5C:
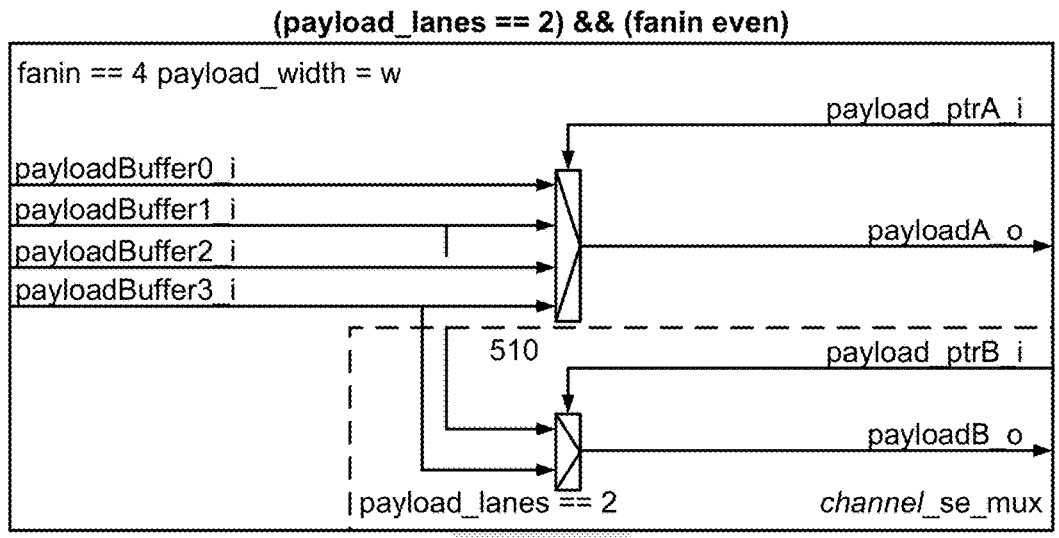

FIGS. 5A, 5B, and 5C illustrate diagrams of embodiments of multiplexers used in single lane and multiple lane payload crossing synchronizers.

On the opposite side from the receiver module is the sender module in the payload crossing synchronizer. The sender module implements the storage buffer. Within the sender module, each multiplexor provides read access to the entries in that FIFO buffer storage. Each multiplexor, such as a first and second multiplexers 510, may be a combinational multiplexor. Each multiplexor has parameters including payload_width, fanin, payload_pointer_width, and payload_lanes for a multiple lane multiplexor.

The table below identifies the configuration parameters associated with the sender module and instances of payload crossing synchronizer implemented.

TABLE 1

Multiplexer module configuration parameters

| Parameter | Description | Range (Default) |
|---|---|---|
| payload_width | The number of bits in each payload word. | (4) 1-256 |
| fanin | The number of storage entries the multiplexer can select between. | (1) 1-6 |
| payload_pointer_width | The number of bits in each payload pointer input. | |
| payload_lanes | The number payload pointer, payload pairs implemented. | 1-2 |

The 'fanin' and 'payload_lanes' parameter values are used to select one of three example forms of multiplexers for the module. These three forms of multiplexers are shown in the FIGS. 5A-5C. If 'payload_lanes'==1, then the first instance of payload crossing synchronizer is implemented (See FIG. 5A). In this case, a simple 'payload_width' wide multiplexer is implemented. It selects among 'fanin' input vectors based upon the payload_pointerA_i input. The result is driven to payload_o. The payload_pointer_width is at least log 2(fanin).

In some cases, an amount of input wires to the multiplexers is optimized by one multiplexer receives all of the multiple data payload inputs from a storage buffer and the other multiplexer receives only half of the data payload inputs from the storage buffer and the Least Significant Bit of the read address pointer going to the other multiplexer is un-used. (See FIG. 5C) Thus, If 'payload_lanes'==2, then there are 2 sets of payload pointer inputs (payload_pointerA_i, payload_pointerB_i) and 2 sets of payload outputs (payloadA_o, payloadB_o). The 'fanin' parameter determines if the second or third form of the payload crossing synchronizer is implemented.

If 'fanin' is an odd number, then the second form of the payload crossing synchronizer is implemented (See FIG. 5B). In this case, two simple 'payload_width' wide multiplexers are implemented in parallel. They share the same set of 'fanin' payload inputs. One multiplexer selects based upon payload_pointerA_i and produces payloadA_o. The other selects based upon payload_pointerB_i and produces payloadB_o. The payload_pointer_width is at least log 2(fanin). Because the number of entries is odd ('fanin'), and each pointer increments by 2 in dual lane mode, each multiplexer must address all entries.

If 'payload_lanes'==2, and 'fanin' is an even number, then the third form is implemented (See FIG. 5C). In this case, two 'payload_width' wide multiplexers are implemented in parallel. One multiplexer selects based upon payload_pointerA_i and produces payloadA_o. It receives all 'fanin' payload inputs. The other selects based upon payload_pointerB_i and produces payloadB_o. It receives only half of the 'fanin' payload inputs—the odd numbered ones. The LSB of payload_pointerB is un-used in this form. The payload_pointer_width is at least log 2(fanin). Because the number of entries is even ('fanin'), and each pointer increments by 2 in dual lane mode, each multiplexer will address only half the entries—one the even ones and the other the odd ones. However, in single lane modes all entries are addressed by payload_pointerA.

The sender module must also carry the second lane ports (payload_pointerB_i, payloadB_o) when configured with 'payload_lanes'==2. These ports are directly connected to the multiplexer child instance for the channel/phase.

Second, the appropriate configuration of the multiplexer instance must be performed. The module must calculate the payload_width. This parameter must be pushed to the multiplexer. 'payload_lanes' is used to configure the ports for the module. It also must be pushed to the multiplexer. Finally, the sender module already has the 'payload buffers' parameter. This must be pushed to the multiplexer as 'fanin'. In an embodiment, the storage is implemented using flip-flops and the multiplexor uses combinatorial logic, but in other embodiments it is a combination of both storage and slot-read-selection functions into a RAM.

Note, Area (gate count) is not noticeably increased by the dual lane feature. The dual lane option primarily adds combinational logic to Interconnect network, not flip-flops. Moreover, it only adds a relatively small amount of that. The multiplexer gate count is de minimis relative to Interconnect network gate count (1%).

Figure 6:
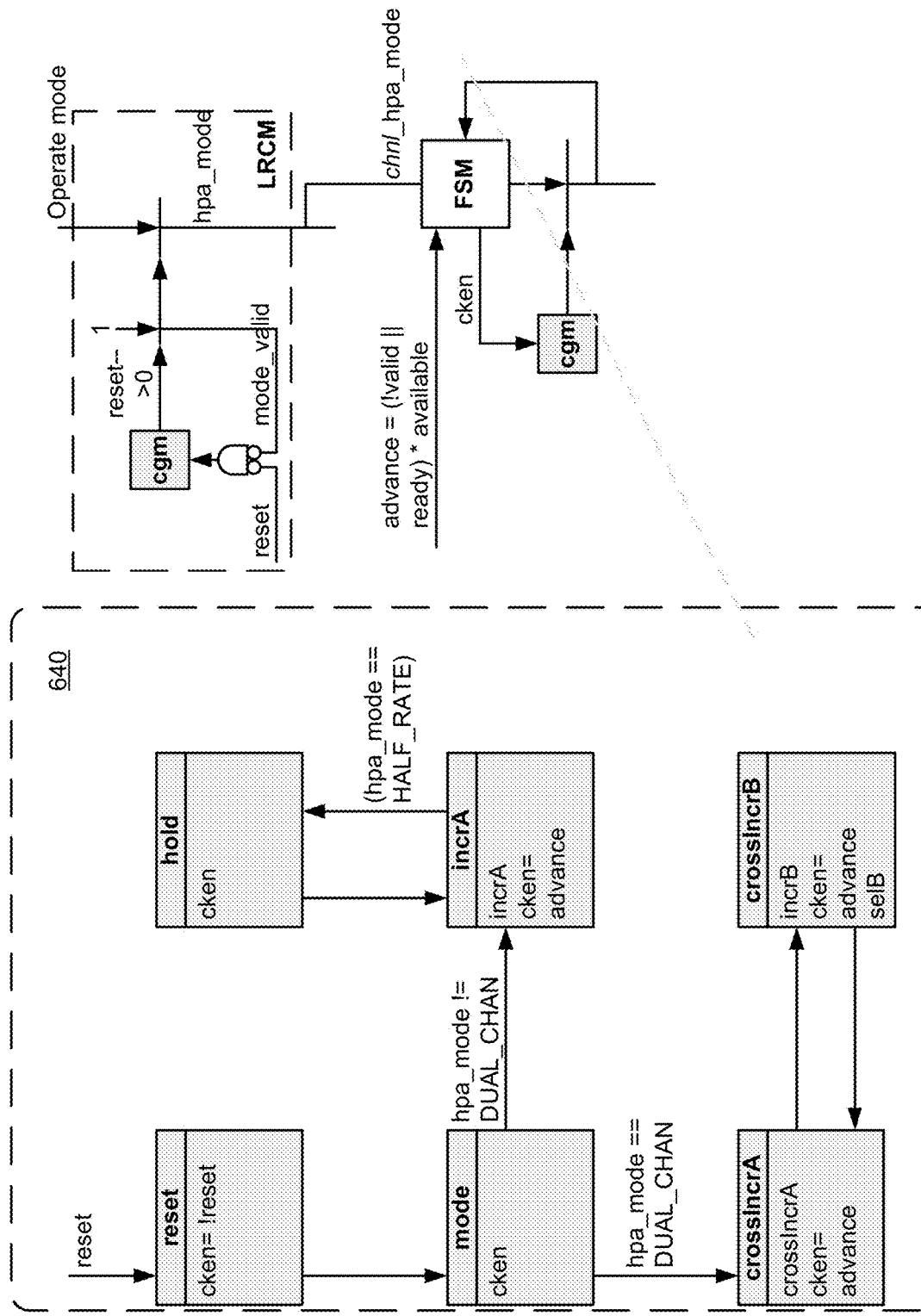
FIG. 6 illustrates a diagram of an embodiment of an operating-mode state machine.

FIG. 6 illustrates a diagram of an embodiment of an operating-mode state machine. The design also adds multiple selectable operating modes, selectable for each channel/phase at hardware Reset time, to operate each lane at either full rate or at some fraction of full rate. The end result is multiple such as three operating modes for each channel/phase: single lane half rate; single lane full rate; or dual lane full rate (each lane at half rate). Thus, a configurable programmable register/table is instantiated that supports and configures multiple selectable operating modes, selectable at hardware Reset time for each instance of the payload crossing synchronizer to operate each multiplexer at either full rate or at some fraction of the full rate.

The operating mode state machine (FSM) 640 generates two important outputs. The incrA output is used to control the payload_pointerA operation. The cken output is used to control a CGM. The gated clock from that CGM operates the FSM itself, the payload_pointerA, the receiver_payload register, and the receiver_hs register. The cken output is also used as one of the controls, with pop_i being the other, for a CGM dedicated to the receiver_payload_valid register.

Referring to FIG. 4, the receiver_payload_valid register is a simple set-clear register, with set dominance. It is set by load_payload, and cleared by pop_i. The receiver block receives 2 bits of hpa_mode into the FSM, which come from the sampled exported constant bits. Therefore, these bits specify the operating mode according to a run time programmable table. These bits are provided to the FSM. The FSM also receives a functional reset input. The final input to the FSM is the load_payload signal.

Referring to FIGS. 6 and 4, when 'payload_lanes'==1, the crossIncrA and crossIncrB states do not exist. This is equivalent to tying hpa_mode[1] to 0. In this case, the FSM initializes into the reset state, then moves through mode (while operating mode constants are captured) into incrA. The FSM then either stays in incrA (if full rate mode) or incrA and hold states (if half rate mode). The hold state provides the minimum 2 cycles for half rate mode.

When 'payload_lanes'==2, the crossIncrA and crossIncrB states are activated in the FSM. This then adds 3 additional outputs: crossIncrA, incrB and selB. selB is used to select either payloadA_i (0) or payloadB_i (1) to be loaded into the receiver_payload register. (See FIG. 4) incrB is used to control the payload_pointerB register. crossIncrA is used to control a wrapping increment of payload_pointerB into payload_pointerA. (See FIG. 4)

The operating mode specified by the captured constant applies as long as reset_n remains un-asserted. The operating mode for the channel or phase determines how the sequences affect the asynchronous receiver of the channel or phase. Sender handshakes are always received asynchronously and synchronized, and receiver handshakes are always launched at the receiver clock rate. However, the amount of time the receiver leaves the payload pointer valid before sampling the payload inputs is controlled by the operating mode. In addition, whether the receiver uses one or two sets of payload pointer and payload vectors is controlled.

Figure 7:
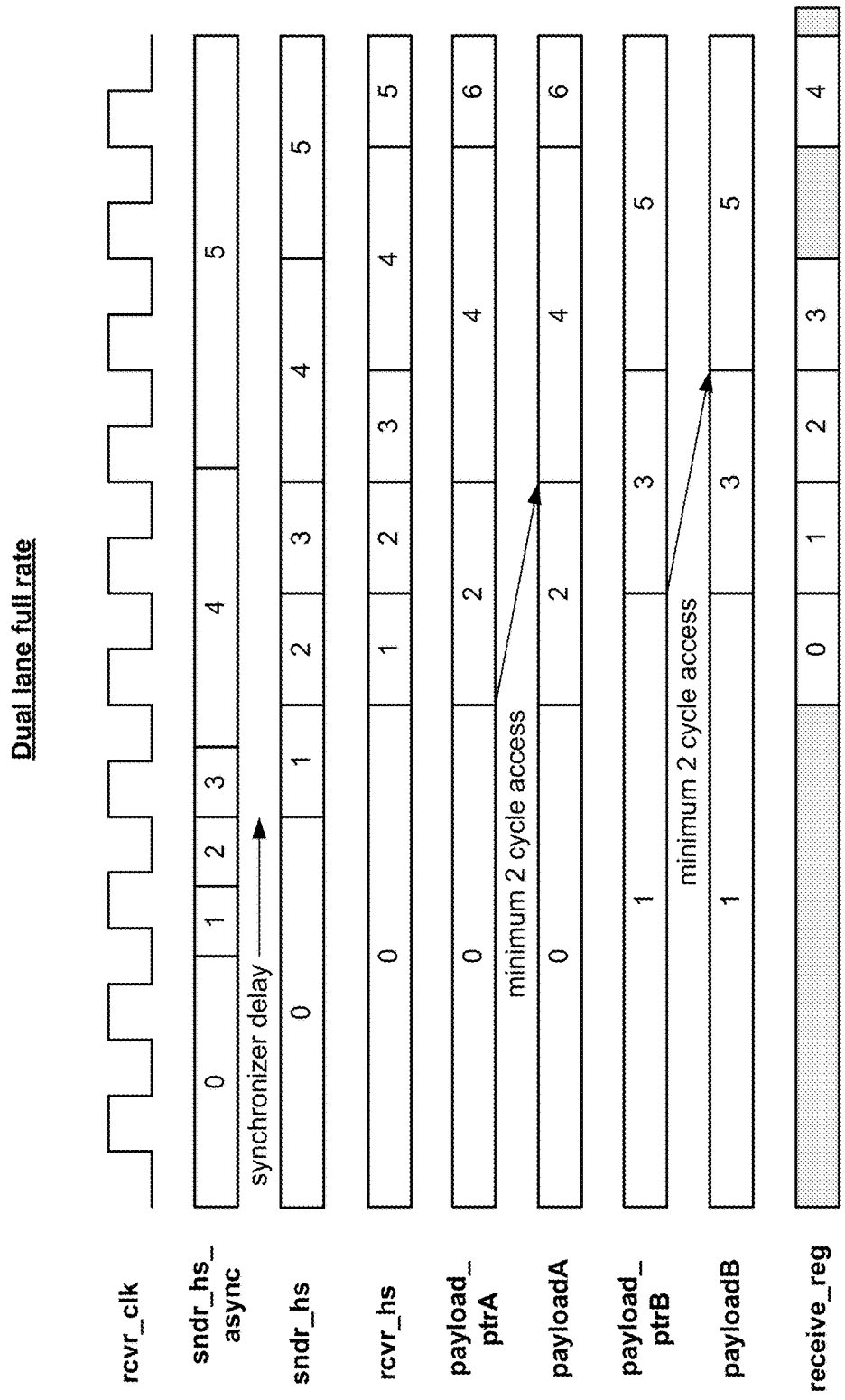
FIG. 7 illustrates a timing diagram of an embodiment of a "multiple lane full rate" operating mode using an example amount of two lanes.

FIG. 7 illustrates a timing diagram of an embodiment of a "multiple lane full rate" operating mode using an example amount of two lanes. The constant input ports are sampled with the clock edge on the timing diagram 750. In this mode, the receiver uses an example two lanes—that is both payload_ptrA and payloadA, and payload_ptrB and payloadB. This mode in an embodiment permits the receiver to capture payload data and advance the payload_ptr for a lane after the pointer has been stable for a minimum of two clock periods. However, the receiver can alternate which lane is used for each access, so that full 100% rate can be maintained overall. FIFO status (comparison of the handshakes) will determine when the receiver does so, but when status permits, the receiver can access the FIFO contents every cycle.

In contrast, when in "single lane full rate" operating mode the receiver uses only a single lane—that is just payload_ptrA_o and payloadA_i. This mode permits the receiver to change the payload_ptr and capture payload data every clock period. FIFO status (comparison of the handshakes)

will determine when the receiver does so. However, when status permits the receiver can access the FIFO contents in consecutive cycles.

Note, when the channel or phase is present, then the bits determine its behavior during operation. The constant input ports are sampled with the first clock edge at which the synchronized hardware reset_n is detected high (un-asserted).

Other points include the following.

The payload crossing synchronizer used in an Interconnect network provides some additional functionality, available in both Interconnect network-AXI components and Interconnect network-OCP components. The following is added.

Support for the boot/reset time selection of the operating mode of specific AXI channels or OCP phases. The modes shall include a normal full rate operating mode, as well as a half rate mode where read accesses of the FIFO storage across the asynchronous boundary require two receiver clock periods at a minimum.

Support for a compile time structural option to configure selected AXI channels or OCP phases with a multiple lane crossing structure, so its operating rate of the receiver may be doubled without doubling the frequency of the receiver logic paths.

Simulation and Modeling

Figure 8:
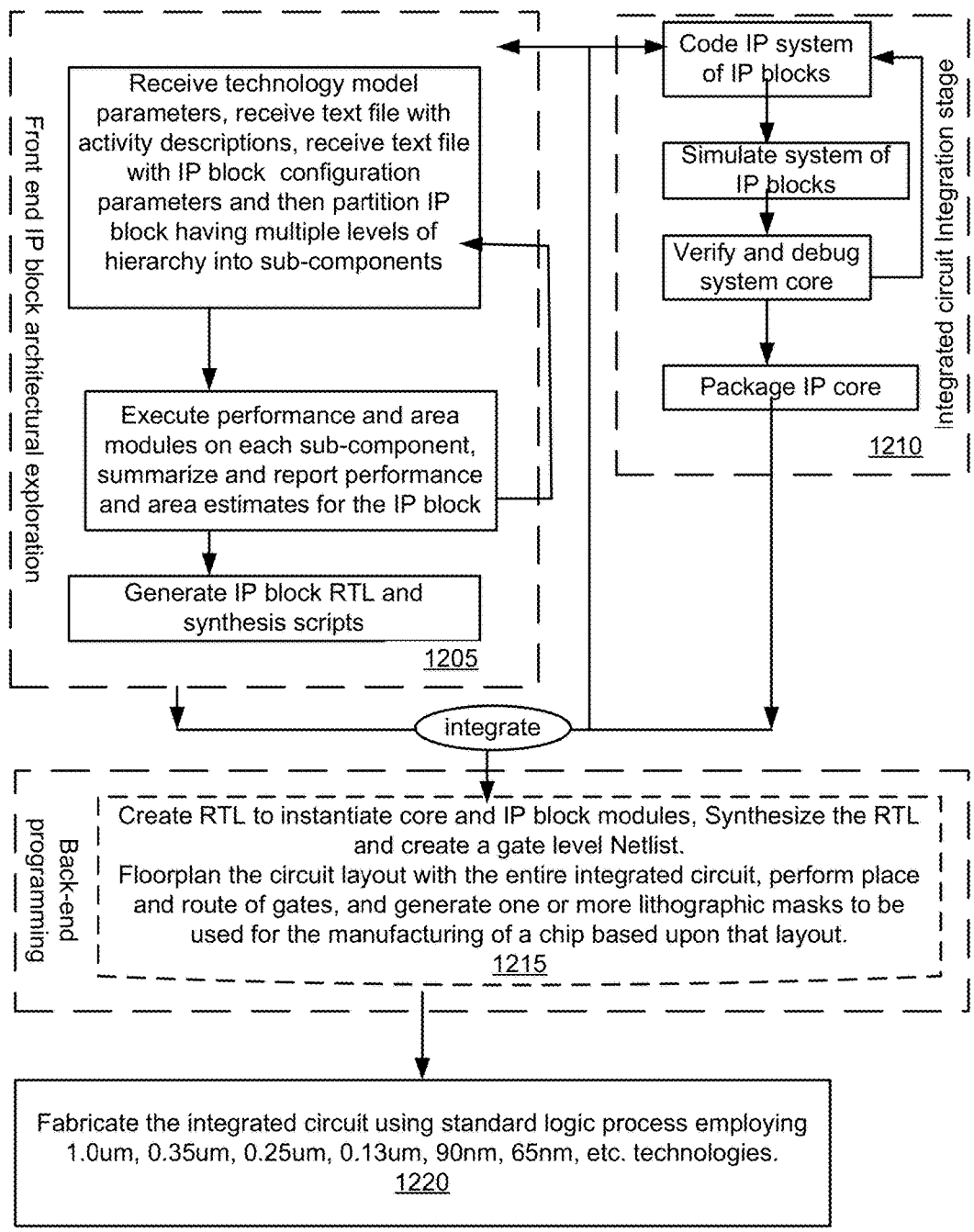
FIG. 8 illustrates a flow diagram of an embodiment of an example of a process for generating a device, such as a System on a Chip, in accordance with the systems and methods described herein.

FIG. 8 illustrates a flow diagram of an embodiment of an example of a process for generating a device, such as a System on a Chip, in accordance with the systems and methods described herein. The example process for generating a device with designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar non transitory machine-readable storage medium storing this data and instructions, which, when executed by a machine, cause the machine to generate a representation of the apparatus. The information representing the apparatuses and/or methods stored on the machine-readable storage medium may be used in the process of creating the apparatuses, or model representations of the apparatuses such as simulations and lithographic masks, and/or methods described herein. An Electronic Design Automation (EDA) toolset may be used in a System-on-a-Chip design process that has data and instructions to generate the representations of the apparatus.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium. The machine-readable medium may have data and instructions stored thereon, which, when executed by a machine, cause the machine to generate a representation of the physical components described above. This machine-readable medium stores an Electronic Design Automation (EDA) toolset used in a System-on-a-Chip design process, and the tools have the data and instructions to generate the representation of these components to instantiate, verify, simulate, and do other functions for this design.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1215, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultra-violet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For example, the encoding and decoding of the messages to and from the CDF may be performed in hardware, software or a combination of both hardware and software. It has proven convenient at times, principally for reasons of common usage, to refer to these signals as bits, values, elements, symbols, characters, terms, numbers, or the like. While some specific embodiments of the invention have been shown the invention is not to be limited to these embodiments. The invention is to be understood as not limited by the specific embodiments described herein, but only by scope of the appended claims.

The invention claimed is:

1. An apparatus, comprising:
a payload crossing synchronizer that includes a sender module on one side of a clock boundary and a receiver module on the other side of the clock boundary, where the payload crossing synchronizer has an internal communications path between the sender module and the receiver module, where the communications path is implemented with spatial concurrency having M amount of identical paths in parallel called lanes, where each of the M lanes when a total of N lanes are active operates at a lane frequency of M divided by N times the receiver frequency, and where the sender module and the receiver module implement compatible interleave and de-interleave algorithms with an inverse relationship respectively, where a storage buffer in the sender module supplies data payload to be moved across the clock boundary from the sender module to a receiver storage register in the receiver module, and the storage buffer and the receiver storage register operate according to different clocks, where the M amount of paths instantiated is greater than or equal to the N amount of lanes active.

2. The apparatus of claim 1, where sequencing logic configured to implement the interleave and de-interleave algorithms regulates transfers on the communications path to achieve a 100% utilization rate at the lane frequency of F even though each lane of the communications path operates at merely the M divided by N times the receiver frequency.

3. The apparatus of claim 1, where sequencing logic configured to implement the algorithms causes a series of transfers that are numbered sequentially, and modulo X assigned to one of X amount of storage buffer locations in the sender module, where each of the lanes includes 1) its own read address pointer by which the sequencing logic specifies the buffer storage location to be accessed and 2) its own output data path to the receiver storage register in the receiver module, where the sequencing logic starts an access each cycle, selecting a first lane using a rotating pattern, and offering a storage location address from the X amount of locations on the read pointer for that lane, where in this fashion, N amount of accesses are in progress at once, on N amount of different active lanes, and at N amount of different stages of completion.

4. The apparatus of claim 1, wherein the different clocks are asynchronous and operate at different frequencies.

5. The apparatus of claim 1, wherein the N amount of lanes active is greater than one.

6. An apparatus, comprising:
a payload crossing synchronizer that includes a sender module on one side of a clock boundary and a receiver module on the other side of the clock boundary, where the sender module has a storage buffer, which is clocked at a write clock frequency, where the sender module and the receiver module engage in a qualified event synchronization to communicate status change events regarding use of entries in the storage buffer, and where the sender module also has two or more multiplexers to pass the data payload over to a receiver storage register in the receiver module, which is clocked at a read clock frequency, where each of the two or more multiplexers on the sender side of the boundary has 1) its own read address pointer lane coming from sequencing logic located on the receiver side and 2) its own data payload lane to send data payload from that multiplexer across the clock boundary to the receiver storage register on the receiver side in the qualified event synchronization, where a source of the write clock frequency clocking the storage buffer feeding data payload to the multiplexers is separate from a source of the read clock frequency clocking the receiver storage register, where the sequencing logic ensures that the multiple read address pointers going to the two or more multiplexers have a fixed alternating relationship amongst themselves to be able move the data payload across the boundary to provide one hundred percent throughput from the sender module to the receiver module as measured on the receiver side based on a capacity of the sender side to supply that amount of data payload.

7. The apparatus of claim 6, where the storage buffer feeding the multiplexers is a register pool used for local storage while a payload access is being performed across the boundary that has components on the two sides of the boundary operating according to the separate clocks, and where a first instance of the payload crossing synchronizer is located at a first boundary in an interconnect network in an integrated circuit, and a second instance of the payload crossing synchronizer is located at a second boundary in the interconnect network, and a type of payload crossing synchronizer placed at the first and second boundaries is individually selectable at design time via configuration parameters, and configuration parameters exist for at least two or more types of payload crossing synchronizer, where the boundary occurs at 1) a power isolation domain boundary, 2) a layout partitioning boundary and 3) a supply-voltage domain boundary, and 4) any combination of the three.

8. The apparatus of claim 6, where the qualified event synchronization includes use of delta encoded validity bits to qualify data payloads to be transferred, where flow control logic is configured to share the validity bit information, perform a validity check of the data payload, and the sequencing logic transfers the data payload to traverse into the receiver storage register in the receiver module, where the flow control and sequencing logic cooperate to support moving data payload from outputs of the two or more multiplexers to the receiver storage register.

9. The apparatus of claim 6, further comprising:
a configurable programmable register configured to support and configure multiple selectable operating modes for the payload crossing synchronizer to operate each multiplexer at either full rate or at some fraction of the full rate.

10. The apparatus of claim 6, where the sequencing logic controls a value of a first read address pointer carried by a first lane across the boundary to a first multiplexer in the sender module that directs the first multiplexer on which data payload word should be selected from its data slot in the storage buffer to be read out and sent across the boundary to the receiver storage register in the receiver module, where the sequencing logic controls a value of a second read address pointer carried by a second lane across the boundary to a second multiplexer in the sender module and directs the second multiplexer on which data payload word should be selected from its data slot in the storage buffer to be read out and sent across the boundary to the receiver storage register in the receiver module, and where the sequencing logic controls an activation of a third multiplexer to choose whether payload data going to the receiver storage register on that cycle is coming from the first multiplexer or the second multiplexer, where the third multiplexer is in the path between the first and second multiplexer and the receiver storage register.

11. The apparatus of claim 6, where the sequencing logic has a state machine and wrapping incrementing logic to control values for the multiple read address pointers going to the two or more multiplexers, a validation portion to validate flow control information associated with the data payload passed from the sender module to the receiver module, and a detection portion to detect when one or more data payloads are present to be transferred from the multiplexers to the receiver storage register, where the sender module and receiver module are synchronous modules operating on different clock frequencies so that a communications path crossing the boundary is operated as an asynchronous crossing.

12. The apparatus of claim 6, where multiple access lanes between the sender module and receiver module cross the boundary, including the lanes carrying the read address pointers and the data payload out of each of the multiplexers, where sequencing logic is configured to process a detection of data payload to be transferred from a first multiplexer and a sending of a read address pointer to the first multiplexer in equal to or longer than a two clock cycle duration on the receiver side; and thus, the two or more multiplexers can each be accessed with at least a 2-cycle sequence, but with the sequences overlapping in a fixed alternating relationship between the two or more multiplexers to achieve the one hundred percent throughput.

13. The apparatus of claim 6, where an amount of input wires to the multiplexers is optimized by a first multiplexer receives all of the multiple data payload inputs from the storage buffer and a second multiplexer receives only half of the data payload inputs from the storage buffer and the Least Significant Bit of the read address pointer in the lane going to the second multiplexer is un-used, and where the sequencing logic is further configured to indicate which address out of the two or more multiplexers is supplying the data payload so logic in the receiver side may check any flow control signals and validate the data payload.

14. The apparatus of claim 6, where the storage buffer feeding the two or more multiplexers is a First in First out register, and where the sequencing logic in the payload crossing synchronizer is configured to move the data payload indicated by the read address pointer across the boundary over a duration of two or more cycles.

15. A method in an interconnect network of an integrated circuit of passing data payload over a clock boundary, comprising:
passing the data payload over the boundary from a sender module on one side of the boundary to a receiver module on the other side of the boundary, where the sender module and the receiver module engage in a qualified event synchronization to communicate status change events regarding use of entries in the storage buffer, and where the sender module has a storage buffer, which is clocked at a write clock frequency, where the sender module also has two or more multiplexers to pass the data payload over to a receiver storage register in the receiver module, which is clocked at a read clock frequency, where each of the two or more multiplexers on the sender side of the boundary has 1) its own read address pointer lane coming from sequencing logic located on the receiver side and 2) its own data payload lane to send data payload from that multiplexer across the boundary to the receiver storage register on the receiver side in the qualified event synchronization, where a source of the write clock frequency clocking the storage buffer feeding data payload to the multiplexers is separate from a source of the read clock frequency clocking the receiver storage register, where the sequencing logic ensures that the multiple read address pointers going to the two or more multiplexers have a fixed alternating relationship amongst themselves to be able move the data payload across the boundary to provide one hundred percent throughput from the sender module to the receiver module as measured using a slower of the sender module's and receiver module's clock.

16. The method of claim 15, further comprising:
using a First in First out (FIFO) register as the storage buffer for sender storage while the qualified event synchronization is being performed across the boundary, and selecting a type of payload crossing synchronizer placed at boundaries in the interconnect at design time via a configuration parameters, and configuration parameters exist for at least two or more types of payload crossing synchronizer, where the boundary occurs at 1) a power isolation domain boundary, 2) a layout partitioning boundary and 3) a supply-voltage domain boundary, and 4) any combination of the three.

17. The method of claim 15, further comprising:
using a configurable programmable register that supports and configures multiple selectable operating modes, selectable at hardware Reset time, for each instance of the payload crossing synchronizer to operate each multiplexer at either full rate or at some fraction of the full rate.

18. The method of claim 15, further comprising:
controlling a value of a first read address pointer carried by a first lane across the boundary to a first multiplexer in the sender module that directs the first multiplexer on which data payload word should be selected from its data slot in a storage buffer to be read out and sent across the boundary to the receiver storage register in the receiver module with the sequencing logic;

controlling a value of a second read address pointer carried by a second lane across the boundary to a second multiplexer in the sender module that directs the second multiplexer on which data payload word should be selected from its data slot in the storage buffer to be read out and sent across the boundary to the receiver storage register in the receiver module with the sequencing logic; and controlling an activation of a third multiplexer to choose whether payload data going to the receiver storage register on that cycle is coming from the first multiplexer or the second multiplexer.

19. The method of claim 16, further comprising:
moving the data payload indicated by the read address pointer across the boundary over a duration of two or more cycles.

20. The method of claim 18, further comprising:
processing a detection of the data payload to be transferred from a first multiplexer and a sending of a read address pointer to the first multiplexer in equal to or longer than a two clock cycle duration on the receiver side; and thus, the two or more multiplexers can each be accessed with at least a 2-cycle sequence, but with the sequences overlapping in a fixed alternating relationship between the two or more multiplexers to achieve the one hundred percent throughput.

* * * * *